United States Patent [19]
Pearce

[11] 3,887,139
[45] June 3, 1975

[54] TRICKLE IRRIGATION EMITTER

[75] Inventor: Denis N. Pearce, Hornton, England

[73] Assignee: Illinois Tool Works Limited, Bucks, England

[22] Filed: May 17, 1974

[21] Appl. No.: 471,102

[52] U.S. Cl. ............................................... 239/542
[51] Int. Cl. .............................................. B05b 15/00
[58] Field of Search ............ 239/542, 547, 553, 145

[56] References Cited
UNITED STATES PATENTS

| | | | |
|---|---|---|---|
| 3,199,791 | 8/1965 | Chapin | 239/542 |
| 3,361,359 | 1/1968 | Chapin | 239/145 |
| 3,613,309 | 10/1971 | Coburn | 239/145 |
| 3,767,124 | 10/1973 | Spencer | 239/542 |
| 3,774,850 | 11/1973 | Zeman | 239/542 |
| 3,779,468 | 12/1973 | Spencer | 239/542 |
| 3,819,118 | 6/1974 | Brock et al. | 239/542 |

*Primary Examiner*—Lloyd L. King
*Attorney, Agent, or Firm*—Robert W. Beart; Jack R. Halvorsen

[57] ABSTRACT

An emitter for a trickle irrigation system comprising a housing defining a chamber, and inlet and outlet ports opening into the chamber, and a substantial length of fine diameter tubing which lies within the chamber and connects to one only of the said inlet and outlet ports.

10 Claims, 4 Drawing Figures

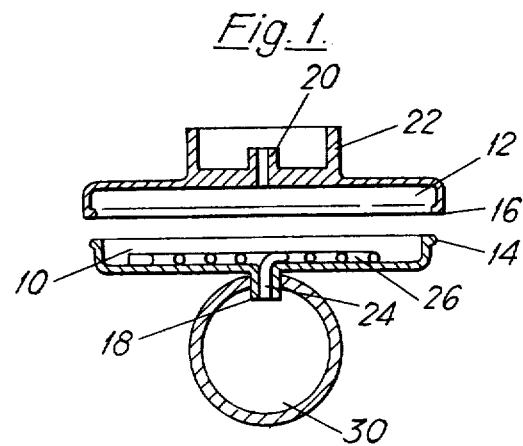
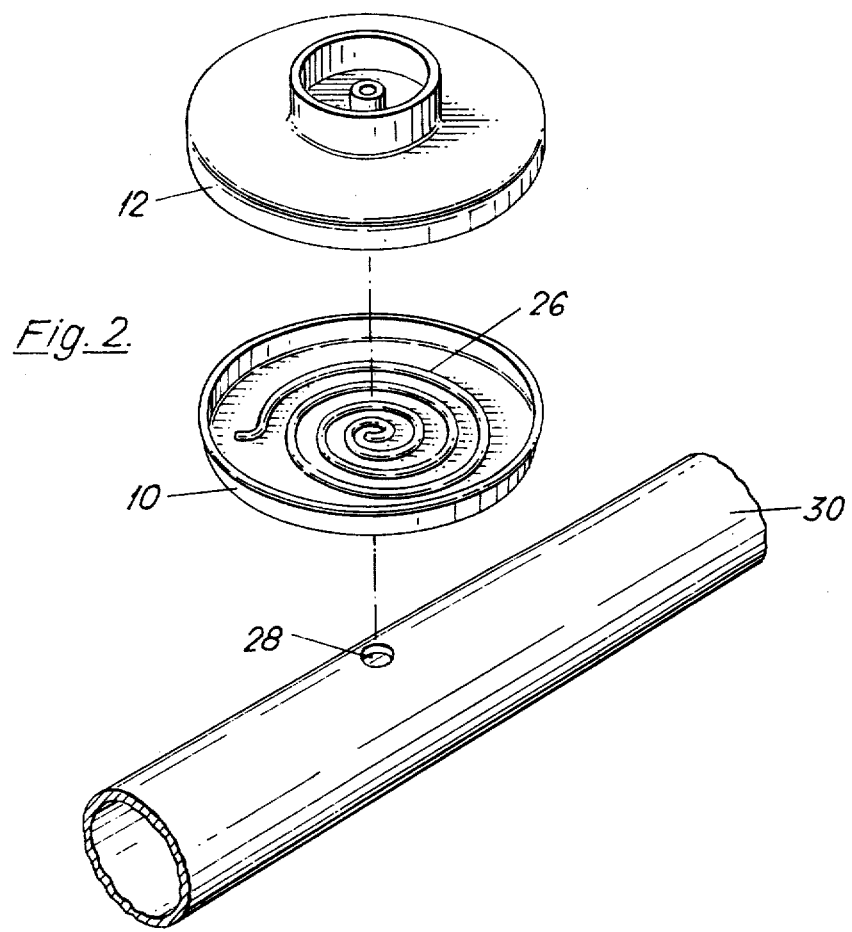

TRICKLE IRRIGATION EMITTER

This invention concerns irrigation, and particularly relates to drip feed irrigation emitters of the kind in which water, for example, is fed through a narrow passageway which presents a marked frictional resistance to the water flow and thereby reduces that flow to no more than a trickle. A problem associated with such an emitter is the need to keep the narrow passageway free of sediment from the water which would otherwise cause a blockage.

According to the present invention, an emitter for a trickle irrigation system comprises a housing defining a chamber which is closed except for inlet and outlet ports, the chamber containing a substantial length of fine diameter tubing which connects to one only of the ports.

Clearly, with such an arrangement the fine diameter tubing is permanently immersed in water retained by the chamber, even when the emitter is not in use, and it has been found that this tends to discourage the build-up of oxidation deposits within the tubing. Moreover, because the fine diameter tubing is spatially constrained at only a single end, the tubing has some freedom to move (for example, coil or uncoil) in response to fluctuations in the pressure of the water flow therethrough. It is thought that the resulting "shaking" tends to lead to self-cleaning of the tubing by periodic removal of sediment.

Preferably, the tubing is arranged for most of its length as a spiral coil, the radially inner end of which is connected to the inlet port. The housing is preferably formed in two parts which can releasably fasten together, each of the parts being a one-piece plastics moulding, and one of the parts being formed with a wall which partially defines a reservoir for water in which the outlet port can remain continuously submerged.

An emitter according to the present invention will now be described, by way of example only, with reference to the accompanying sketches, in which:

FIG. 1 is an axial section through an emitter shown operatively connected to a feed pipe, the upper half of the emitter housing being shown removed from the lower half;

FIG. 2 is a perspective view, and shows the emitter of FIG. 1 in a partially disassembled condition;

Figure 3:
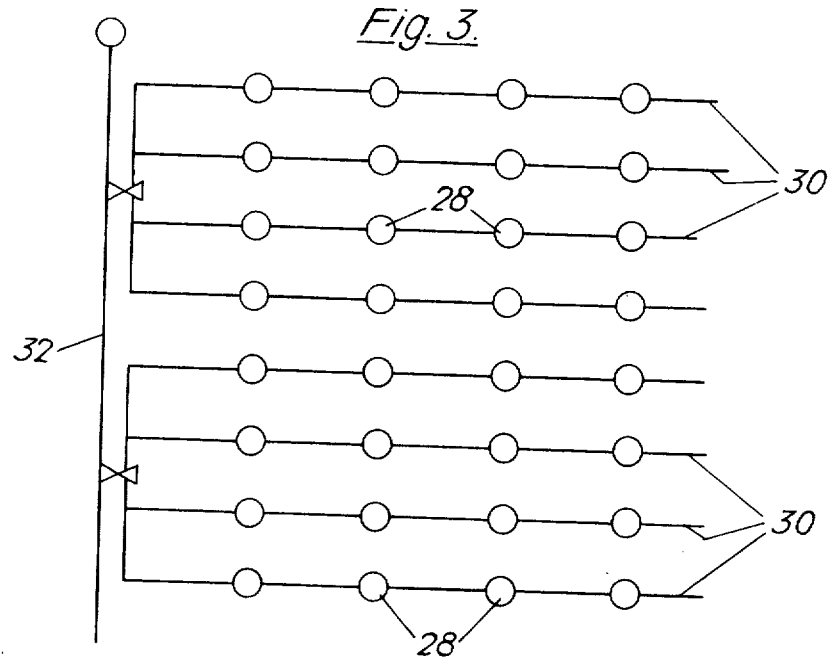
FIG. 3 is a diagrammatic plan of a trickle irrigation system.

The emitter seen in FIGS. 1 and 2 comprises a lower shell 10 and an upper shell 12, both being one-piece plastics mouldings, which can be snapped together to form a hollow housing by means of respective peripheral ribs 14 and 16 which interlock. Projecting down from the lower shell is a small central tube 18, which constitutes an inlet port according to the present invention. Upwards from the upper shell projects a similar tube 20, which constitutes an outlet port according to the present invention and is surrounded by a higher concentric wall 22. The inlet and outlet ports open into a chamber defined by the housing. Fitting closely in the inlet port 18 is one end 24 of a length of fine diameter tubing 26, the remainder of which is loosely coiled as a spiral in the lower shell 10. In an alternative embodiment, the radially inner end of the spiral coil of the tubing 26 could be connected to the outlet port 20.

In use, for example in the application seen in FIGS. 1 and 2, the two shells are snapped together, enclosing the coiled tube 26. The lower tube 18 is push-fitted into a suitably sized aperture 28 in a water pipe 30. Water under pressure passes along the coiled tube 26 and gradually fills the chamber, then passes out through the outlet port 20, fills the reservoir partially defined by the wall 22 and finally trickles out and over the upper shell 12 and onto the ground. The rate of flow is obviously principally dependent on the pressure of the water supply and the friction presented to it by the tubing.

Figure 4:
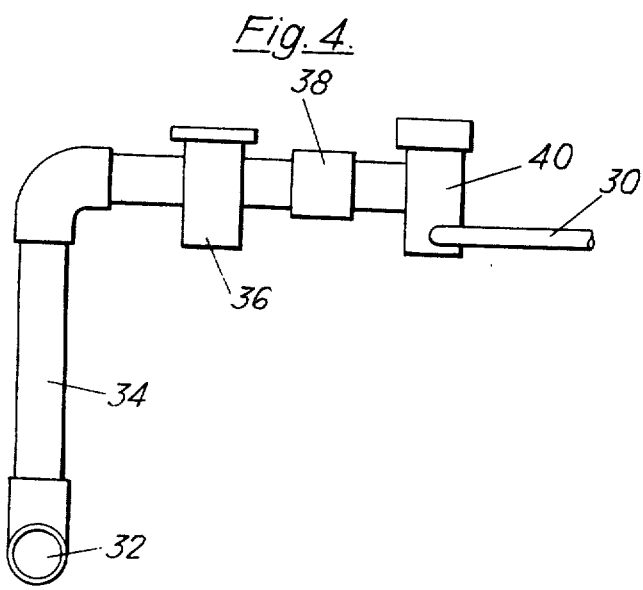
FIG. 4 is an elevation of a portion of FIG. 3.

A trickle irrigation system is seen diagrammatically in FIG. 3. Mains water passes through a header 32 to a number of risers 34. Water flows through each riser 34, passes through a filter 36, and optionally through a flowmeter 38, to a pressure control valve 40. The detail of this is seen to a much larger scale in FIG. 4. The purpose of the valves 40 is to help control to within fine limits the pressure of water transmitted to lateral flow lines 30, several of which can be in flow communication with a single valve 40. The flow lines (or water pipes) 30 have a number of apertures 28 at suitable spacings therealong, each aperture 28 being capable of receiving an emitter of the kind described above.

The flow rate from the emitter can be controlled either by fitting a tube having a different internal diameter, or by increasing or reducing the length of the tubing. The frictional resistance presented by the tubing has a linear relationship to its length.

The emitter is a compact, easily visible, and simply fitted device and is easily manufactured. The two shells are of a simple shape for moulding, and the tubing is readily available. Having the tubing concealed in the housing removes the temptation of animals to eat it.

I claim:

1. An emitter for a trickle irrigation system comprising a housing defining a chamber and inlet and outlet ports opening into the chamber, and a substantial length of fine diameter tubing which has freedom to move in said chamber in response to flucuations of the pressure of fluid flowing through said tube and which lies within said chamber and connects to one only of the said inlet and outlet ports.

2. An emitter according to claim 1, in which the tubing is connected only to the inlet port.

3. An emitter according to claim 1, in which the housing is formed in two parts, each of the parts being a one-piece plastics moulding and being adapted to releasably fasten with the other part.

4. An emitter according to claim 3, in which one of the said two parts is formed with an inwardly-directed peripheral rib and the other part is formed with an outwardly-directed peripheral rib, whereby the two parts can be snapped into engagement with one another.

5. An emitter according to claim 1, in which said tubing remains continuously submerged in trickle irrigation fluid retained by said chamber.

6. An emitter according to claim 5, in which said outlet port opens into a reservoir that is partially defined by a wall arranged concentrically around said outlet port and projecting from one of said parts which form said housing.

7. An emitter according to claim 1, in which said fine diameter tubing is arranged for most of its length as a flat spiral coil.

8. An emitter according to claim 1, which is in flow communication with a pipe through which trickle irrigation fluid is to be fed.

9. An emitter according to claim 2, in which said tubing remains continuously submerged in trickle irrigation fluid retained by said chamber.

10. An emitter according to claim 5, in which said fine diameter tubing is arranged for most of its length as a flat spiral coil.

* * * * *